United States Patent
Peck et al.

(10) Patent No.: US 11,154,816 B2
(45) Date of Patent: Oct. 26, 2021

(54) PALLADIUM OXIDE SUPPORTED ON SPINELS FOR NOX STORAGE

(71) Applicant: Toyota Motor Engineering & Manufacturing North America, Inc., Plano, TX (US)

(72) Inventors: Torin C. Peck, Ann Arbor, MI (US); Krishna Gunugunuri, Canton, MI (US); Charles Alexander Roberts, Farmington Hills, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 32 days.

(21) Appl. No.: 16/426,078

(22) Filed: May 30, 2019

(65) Prior Publication Data

US 2020/0376433 A1 Dec. 3, 2020

(51) Int. Cl.
*B01J 23/89* (2006.01)
*B01J 37/02* (2006.01)
(Continued)

(52) U.S. Cl.
CPC ..... *B01D 53/9481* (2013.01); *B01D 53/9418* (2013.01); *B01D 53/9445* (2013.01);
(Continued)

(58) Field of Classification Search
CPC ...... B01J 23/892; B01J 37/0201; B01J 37/08; F01N 3/0814; F01N 3/0842; F01N 3/2066
See application file for complete search history.

(56) References Cited

U.S. PATENT DOCUMENTS 3,751,512 A * 8/1973 Woskow et al. ..... B01J 23/8933
585/625
4,397,729 A * 8/1983 Duruz ..................... C25C 7/025
204/243.1
(Continued)

FOREIGN PATENT DOCUMENTS

WO 2009137110 A1 11/2009

OTHER PUBLICATIONS

Borhade, S. et al., "Heck reaction over palladium supported on nickel ferrite as an efficient and inexpensive catalyst," Indian Journal of Chemistry, vol. 47B, Oct. 2008, pp. 1549-1554.
(Continued)

*Primary Examiner* — Cam N. Nguyen
(74) *Attorney, Agent, or Firm* — Christopher G. Darrow; Darrow Mustafa PC

(57) ABSTRACT

Passive $NO_x$ adsorption (PNA) compositions have a formula Pd—$NiFe_2O_4$ wherein Pd represents a palladium component, such as palladium oxide, that is adsorbed on surfaces of the nickel ferrite. Such compositions can be synthesized by wet impregnation of nickel ferrite with a palladium salt, and exhibit efficient $NO_x$ adsorption at low temperature, with $NO_x$ desorption occurring predominantly at high temperature. Two-stage $NO_x$ abatement catalysts, effective under engine cold start conditions, include a PNA composition upstream from an $NO_x$ conversion catalyst.

15 Claims, 8 Drawing Sheets

(51) Int. Cl.
*B01J 37/08* (2006.01)
*F01N 3/08* (2006.01)
*F01N 3/20* (2006.01)
*B01D 53/94* (2006.01)

(52) U.S. Cl.
CPC ......... *B01J 23/892* (2013.01); *B01J 37/0201* (2013.01); *B01J 37/08* (2013.01); *F01N 3/0814* (2013.01); *F01N 3/0842* (2013.01); *F01N 3/2066* (2013.01); *B01D 2255/1023* (2013.01); *B01D 2255/91* (2013.01); *F01N 2250/12* (2013.01); *F01N 2570/14* (2013.01)

(56) References Cited

U.S. PATENT DOCUMENTS

| | | | | |
|---|---|---|---|---|
| 4,493,754 A | * | 1/1985 | Abys | C25D 17/10 205/265 |
| 5,779,873 A | * | 7/1998 | Law | C25D 3/12 205/271 |
| 7,635,518 B1 | * | 12/2009 | Misra | B82Y 25/00 428/403 |
| 2015/0158019 A1 | | 6/2015 | Rajaram et al. | |

OTHER PUBLICATIONS

Milhai, O. et al., "Palladium, zeolite, ceria based passive NOx adsorbers," 2017 CLEERS Proceedings, retrieved from https://cleers.org/cleers-workshops/workshop-abstracts/?entry_id=481 (last downloaded Sep. 17, 2018).

Zheng, Y. et al., Low-Temperature Pd/Zeolite Passive NOx Adsorbers: Structure, Performance, and Adsorption Chemistry, J. Phys. Chem. C 2017,121, pp. 15793-15803.

Jones, S. et al., "Ceria-Based Catalysts for Low Temperature NOx Storage and Release," Catal Lett (2016) 146:909-917.

Ji, Y. et al., "Pt- and Pd-Promoted $CeO_2$—$ZrO_2$ for Passive NOx Adsorber," Ind. Eng. Chem. Res., 2017, 56, pp. 111-125.

\* cited by examiner

PALLADIUM OXIDE SUPPORTED ON SPINELS FOR NOX STORAGE

TECHNICAL FIELD

The present disclosure generally relates to catalysts for conversion and storage of undesired components in a combustion exhaust and, more particularly, to catalysts for the storage of $NO_x$ during cold-start of vehicles.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Nitric oxide (NO) and nitrogen dioxide ($NO_2$) are noxious components of combustion exhaust streams. Many catalysts for converting NO and $NO_2$ ($NO_x$) into $N_2$ and $O_2$, in a variety of operating conditions are known, however high $NO_x$ conversion efficiencies are not realized until higher temperatures, typically in excess of 200 Celsius. Direct $NO_x$ decomposition and ammonia-utilizing selective catalytic reduction ($NH_3$—SCR) of $NO_x$ are examples of processes for $NO_x$ abatement. But catalysts for direct decomposition and $NH_3$—SCR frequently have low activity and/or selectivity to $N_2$ below 200° C. and form undesirable products such as $N_2O$ or ammonium nitrate, respectively.

Further, most conversion catalysts have little-to-no activity, such that $NO_x$ is not converted during vehicle "cold start" conditions, when exhaust and converter temperature are low. Passive $NO_x$ adsorbers (PNAs), which retain $NO_x$ at low temperature and release it at higher temperature, can minimize this issue.

Lean $NO_x$ trap systems can be utilized to temporarily adsorb/store $NO_x$ during fuel-lean conditions, and to release $NO_x$ during fuel-rich exhaust conditions. Such systems require precise control of the air-to-fuel ratio being input to the vehicle's internal combustion engine, however, and have a tendency to desorb $NO_x$ at unsuitably low temperature, making them ineffective as PNAs for cold start conditions.

Accordingly, it would be desirable to provide improved $NO_x$ adsorption materials capable of efficiently adsorbing and storing $NO_x$ at low temperature, while releasing $NO_x$ at suitably high temperature.

SUMMARY

This section provides a general summary of the disclosure and is not a comprehensive disclosure of its full scope or all of its features.

In various aspects, the present teachings provide a two-stage $NO_x$ abatement device for removal of $NO_x$ from engine exhaust gas during a cold start. The device includes an enclosure having upstream and downstream portions defined relative to an intended direction of flow of exhaust gas. The device further includes a passive $NO_x$ adsorption (PNA) composition that includes a nickel ferrite ($NiFe_2O_4$) substrate and a palladium component deposited on surfaces of the nickel ferrite. The device additionally includes a $NO_x$ conversion catalyst located downstream from the storage component, and configured to catalyze conversion of $NO_x$. During an engine cold start, $NO_x$ is retained in the storage component until the exhaust and the device have warmed sufficiently to activate the downstream conversion catalyst.

In other aspects, the present teachings provide a method of synthesizing an $NO_x$ abatement composition. The method includes a step of performing wet impregnation of nickel ferrite with a palladium salt solution having a volatile or combustible anion, to produce an impregnated composition. The method further includes a step of calcining the impregnated composition in an oxidative atmosphere to produce the PNA composition.

In still other aspects, the present teachings provide a passive $NO_x$ adsorption (PNA) composition. The PNA composition includes a nickel ferrite ($NiFe_2O_4$) substrate; and palladium oxide adsorbed on surfaces of the nickel ferrite.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

Figure 1A:
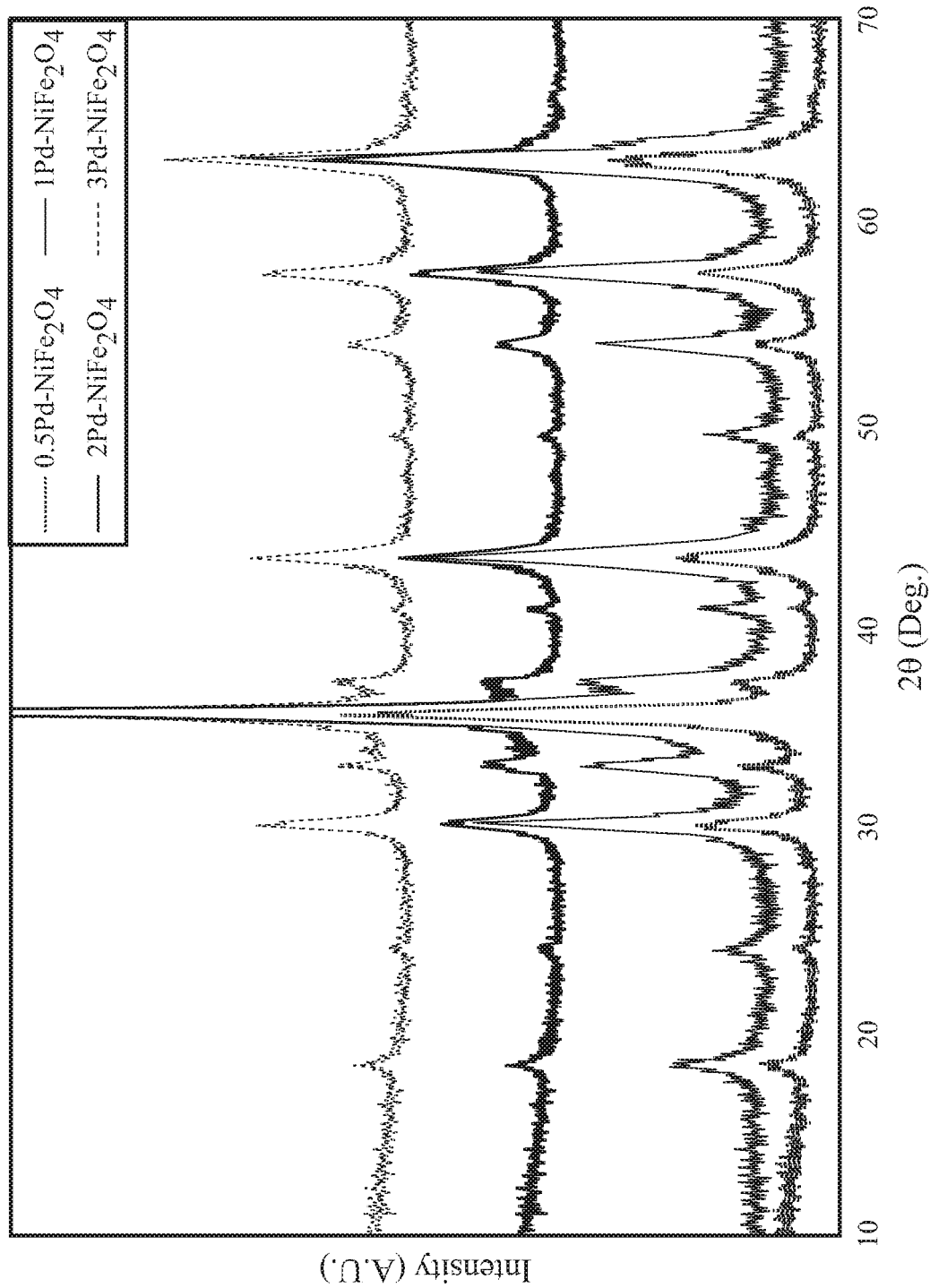
FIGS. 1A and 1B are plots of x-ray diffraction data of a passive $NO_x$ adsorption (PNA) composition of the present teachings.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present teachings provide passive $NO_x$ adsorption (PNA) compositions suitable for use in cold start conditions, and methods for synthesizing them. The present teachings further provide two-stage methods and devices for the removal of $NO_x$ from a combustion exhaust stream PNA compositions of the present disclosure are formed of nickel ferrite ($NiFe_2O_4$) spinel, surface modified with palladium oxide, and can be represented formulaically as Pd—$NiFe_2O_4$. Methods for synthesizing the disclosed PNA compositions include wet impregnation of nickel ferrite with a palladium salt, followed by oxidative heating. Such a composition shows favorable NO adsorption capacity in comparison to unmodified $NiFe_2O_4$ and, in particular, shows superior rapid, low temperature NO adsorption capacity coupled with high temperature desorption.

Thus, PNA compositions are disclosed, having a spinel structure and a formula according to Formula A:

$$Pd—NiFe_2O_4 \qquad A.$$

wherein Pd represents a palladium component that is deposited on surfaces of the nickel ferrite. It will be understood that, in many implementations, the nickel ferrite substrate will be porous, such that the palladium component is deposited on interior surfaces, or substantially impregnated into the nickel ferrite substrate. In many implementations, the palladium component can consist primarily of particles of palladium salts, particularly salts of Pd(II), and more particularly of palladium oxide. It will be understood that unmodified nickel ferrite ($NiFe_2O_4$, alternatively referred to herein as "the substrate") is generally an inverse spinel, with nickel(II) generally occupying octahedral sites in the spinel structure and iron(III) occupying both tetrahedral and octahedral sites. In certain implementations, the formula of the substrate can vary somewhat from pure $NiFe_2O_4$, for example with minor doping with an additional metal (e.g. $M_xNi_{1-x}Fe_2O_4$), with an overabundance of nickel relative to iron, or an overabundance of iron relative to nickel.

In various implementations, the palladium component can be present in the PNA composition in an amount within a range of about 0.1 wt. % to about 3 weight percent (wt. %), inclusive, where the wt. % refers to the mass of palladium cation relative to the mass of substrate, as shown in exemplary Equation 1:

$$\text{wt. \%} = \frac{\text{mass[Pd]}}{\text{mass[NiFe}_2\text{O}_4\text{]}} \times 100 \qquad \text{Eq. 1}$$

In certain implementations, the palladium component can be present at from about 0.1 wt. % to about 1.5 wt. %. In some implementations, the palladium component can be present at from about 0.5 wt. % to about 1 wt. %. The weight percentage can alternatively be referred to as "loading density" hereinafter.

PNA compositions of the present teachings can be synthesized by a method that includes a step of wet impregnation of nickel ferrite with a palladium salt solution, such as palladium(II) acetylacetonate in toluene. In certain implementations, the palladium salt will preferably have a volatile or combustible anion. The concentration of the palladium salt solution can be modulated to achieve the desired palladium loading density (i.e. the desired final palladium weight percentage). The method for synthesizing a PNA composition of the present teachings can additionally include a step of calcining the impregnated composition in an oxidative atmosphere. It will be understood that the calcining step will tend to remove the anion of the palladium salt and oxidize the palladium, such as to PdO.

Figure 1B:
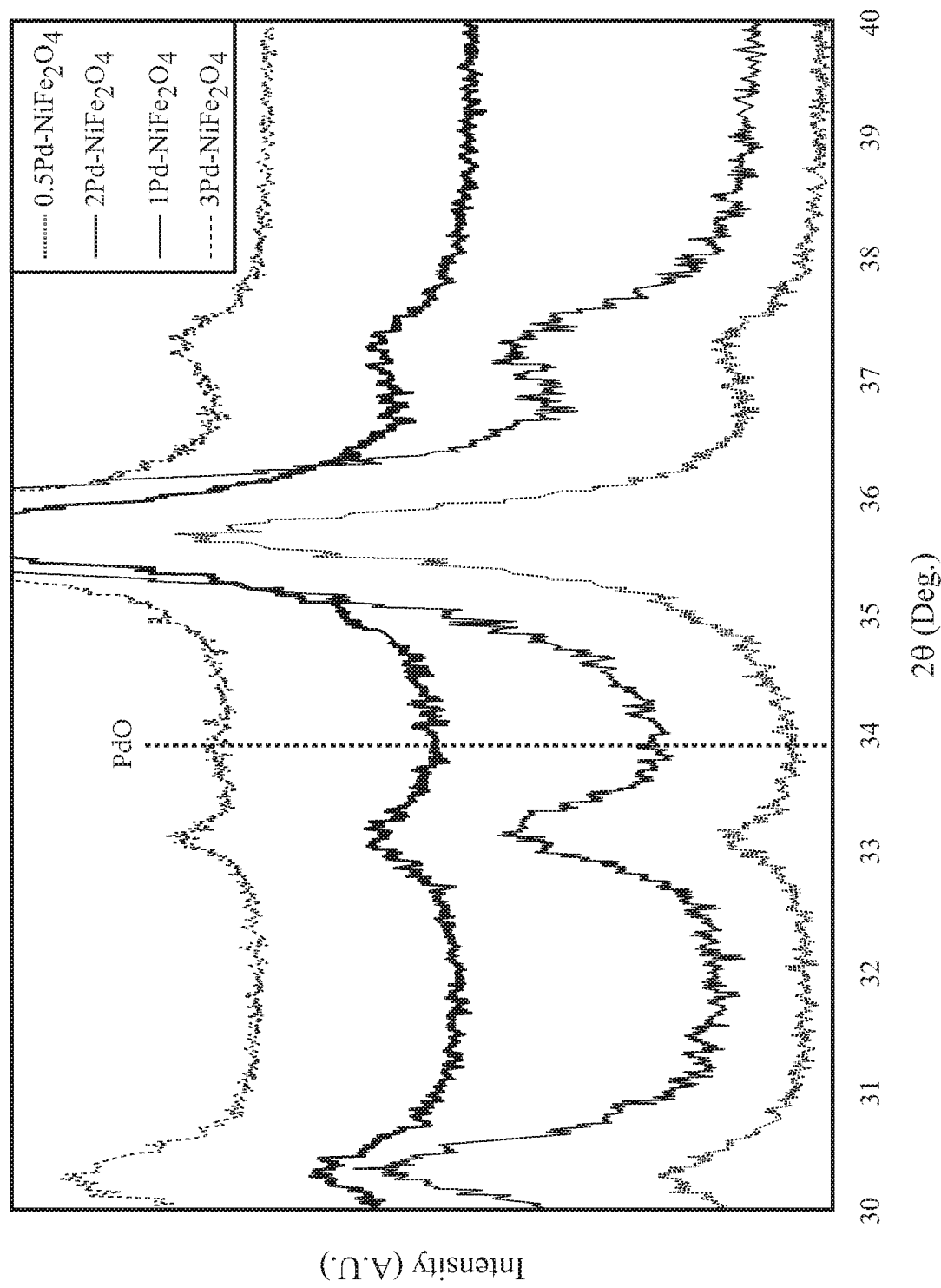

FIGS. 1A and 1B show x-ray diffraction (XRD) data for various PNA compositions of the present teachings having different weight percentages of palladium. In FIGS. 1A and 1B, palladium weight percentages are appended to the front of the composition formula (e.g. "0.5Pd—$NiFe_2O_4$" refers to a PNA composition of the present teachings having 0.5 wt. % Pd). This nomenclature will be used at times hereinafter. FIG. 1A shows the XRD data of PNA compositions having 0.5, 1, 2, or 3 wt. % palladium, as measured from 20 of ten to seventy degrees. FIG. 1B shows the same data, but only from thirty to forty degrees. No palladium is seen within the detection limits for samples having up to 2 wt. % Pd, however a diffraction peak at about 34°, indexing to palladium oxide and labeled as PdO, is observed for the PNA composition having 3 wt. % Pd (FIG. 1B).

Figure 2:
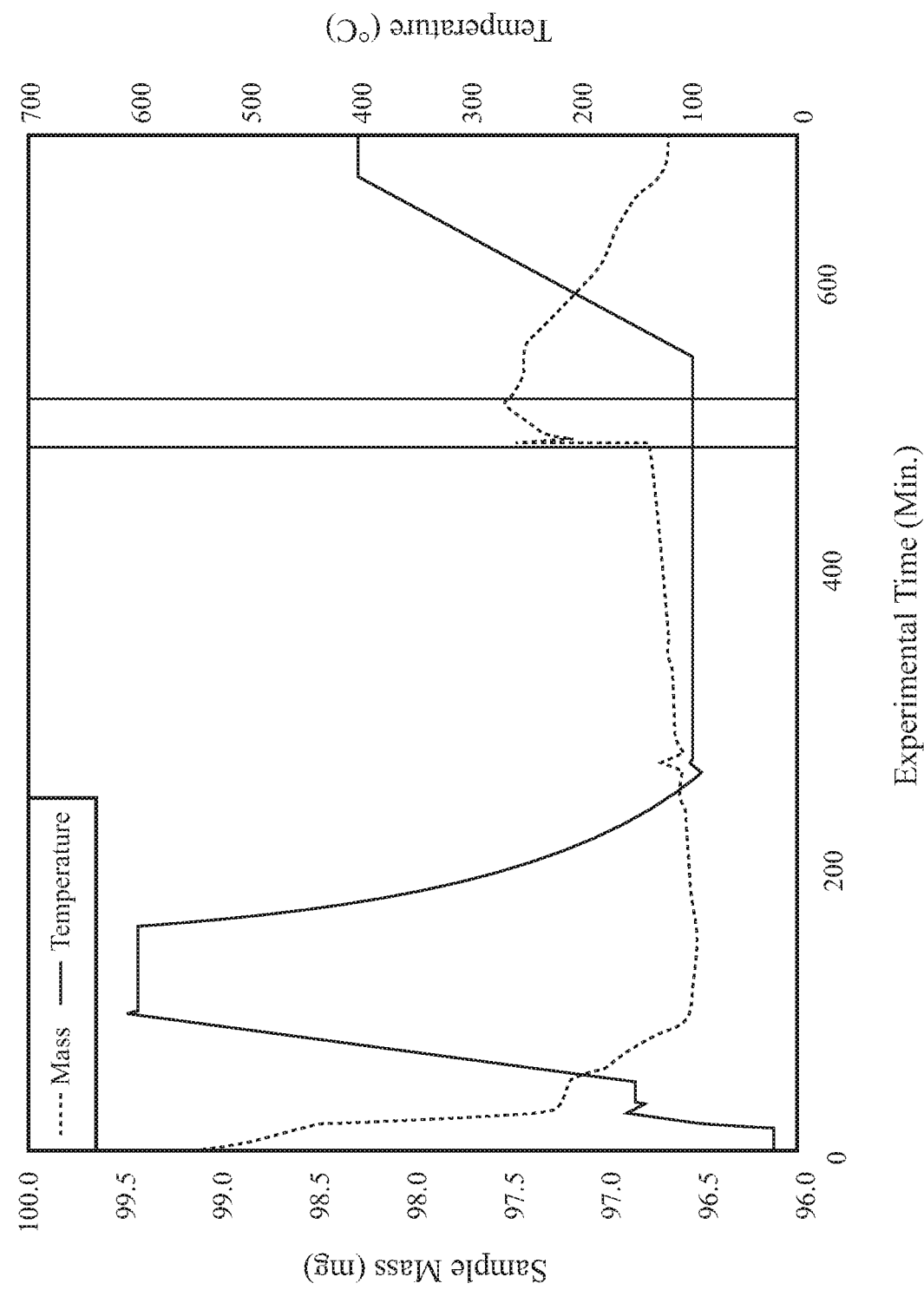
FIG. 2 shows a nitric oxide (NO) adsorption/desorption profile of a PNA composition of the present teachings.

FIG. 2 shows a nitric oxide (NO) adsorption/desorption profile of a PNA composition of the present teachings, at 1 wt. % loading density. The graph of FIG. 2 shows sample mass (i.e. mass of the PNA composition) and applied temperature as a function of experiment time. The portion of the graph up to about 480 minutes shows sample pretreatment, while the portion highlighted by the vertical bar, at about 480 to 510 minutes, shows absorption of 1.5% NO. It can be seen that there is a rapid and immediate increase in sample mass upon introduction of NO flow at 100° C., resulting from adsorption of NO by the PNA composition. In addition, the NO is not fully desorbed until the sample temperature is increased to 400° C.

Figure 3A:
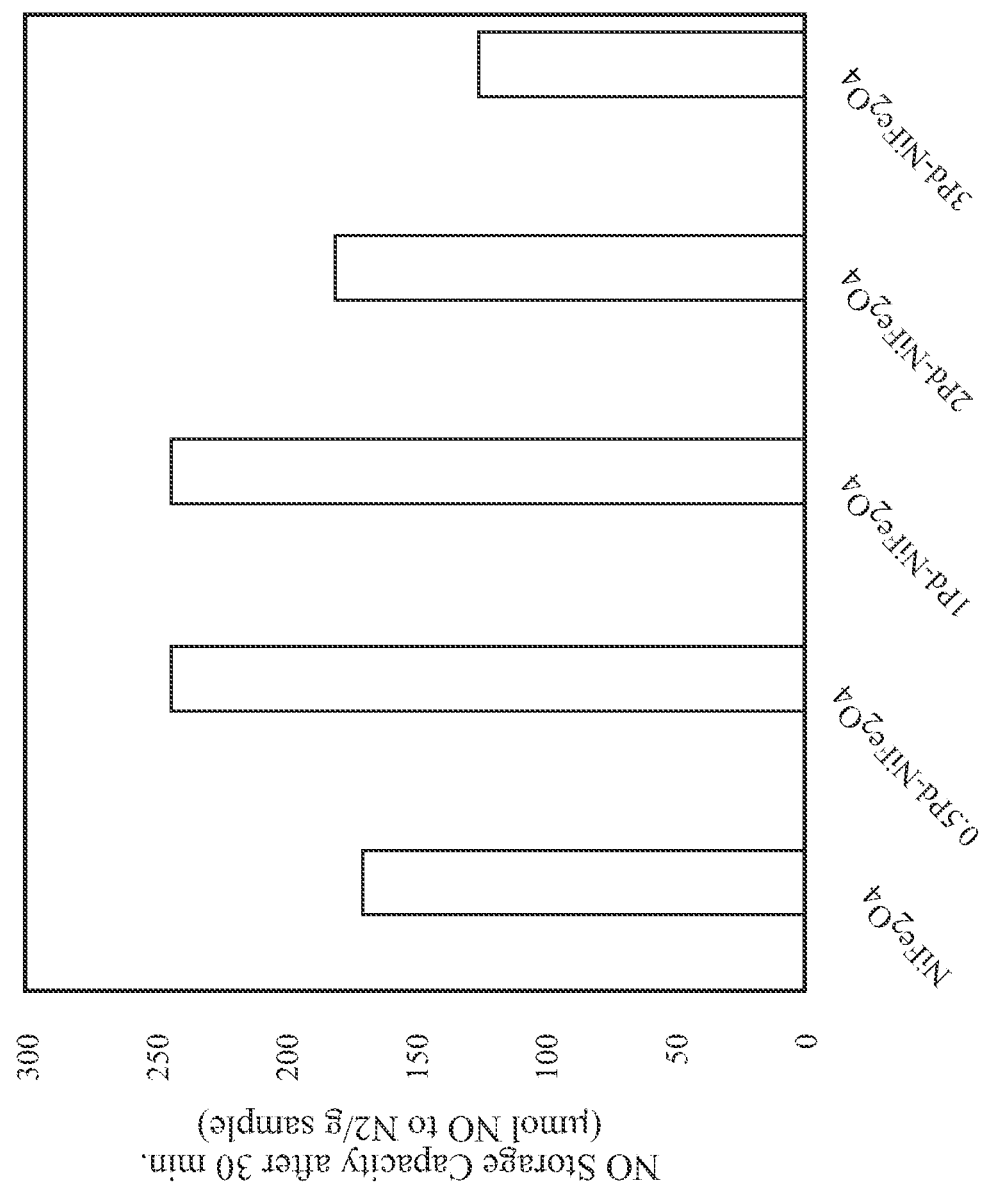
FIGS. 3A-3C shows bar graphs of NO adsorption/desorption quantities of various PNA compositions of the present teachings, as well as select comparative compositions.
Figure 3B:
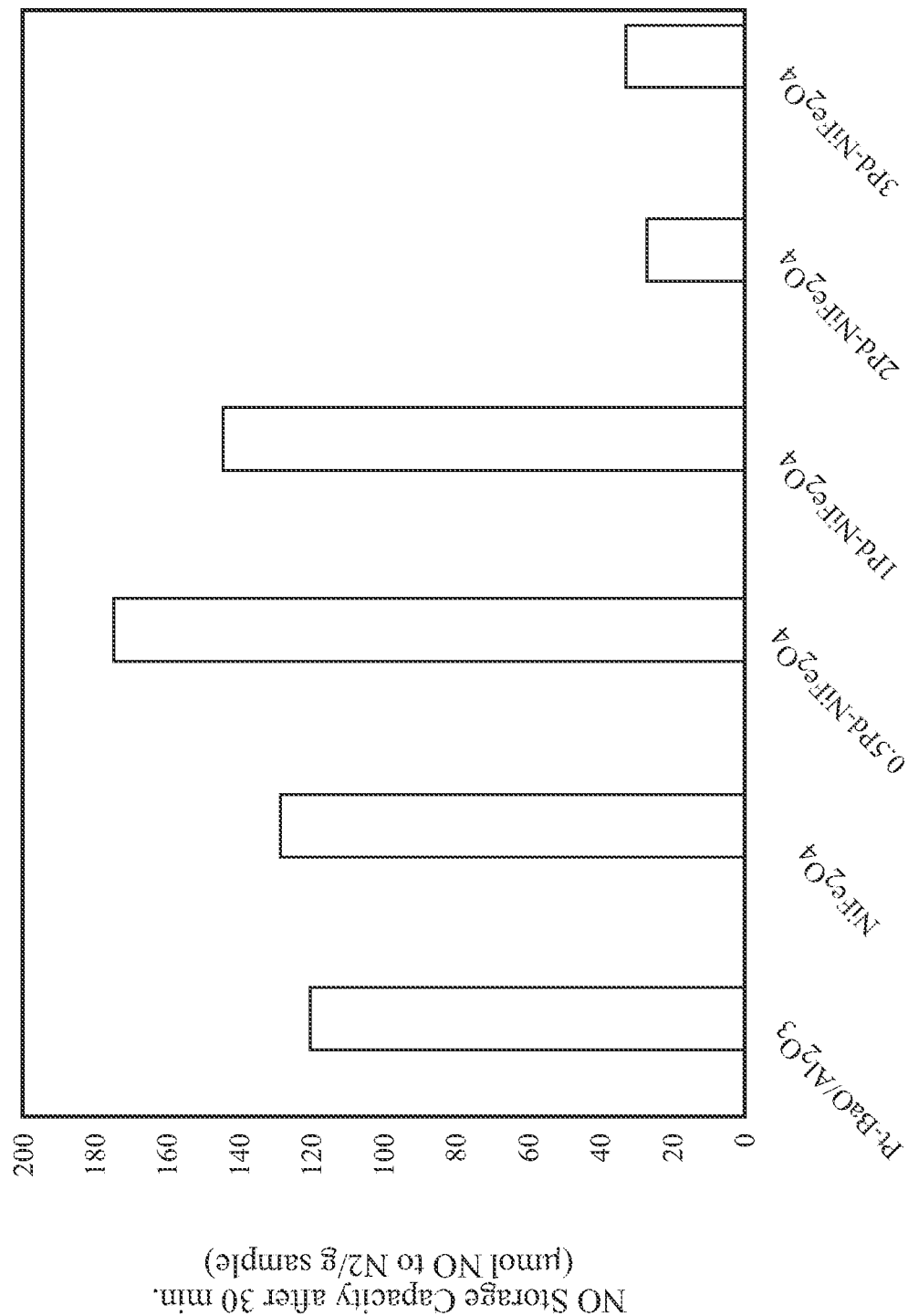
Figure 3C:
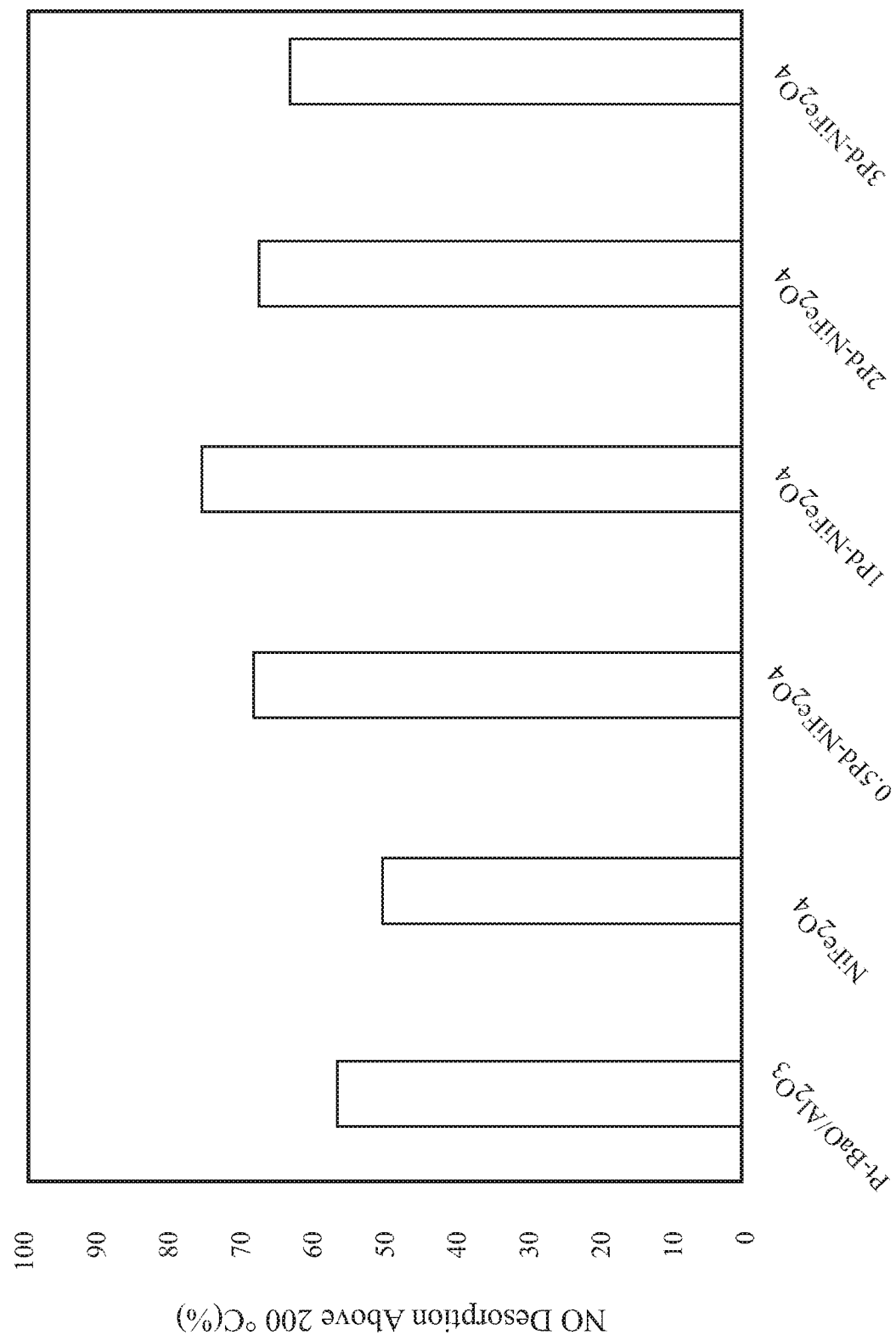

The amount of adsorbed NO is calculated by thermogravimetric analysis calculations, based on NO adsorption/desorption profiles of the type shown in FIG. 2. FIGS. 3A-3C show bar graphs of NO adsorption/desorption quantities of various PNA compositions of the present teachings, as well as select comparative compositions. FIG. 3A shows a bar graph of percent of adsorbed NO after 30 minutes of NO flow exposure, for various PNA compositions of the present teachings (having 0.5, 1, 2, or 3 wt. % palladium) as well as for palladium-free nickel ferrite substrate. The results show that the overall NO adsorption capacities of the materials is in the order of 1 wt. % Pd≈0.5 wt. % Pd 22 2 wt. % Pd>palladium-free substrate>3 wt. % Pd. The maximum amount of adsorbed NO (exhibited by PNA compositions with 0.5 or 1% Pd) is about 244 μmol of NO per gram of PNA composition.

FIG. 3B shows a bar graph similar to that of FIG. 3A, but where adsorbed NO quantity is measured after 120 seconds (rather than 30 minutes) of exposure to NO flow. The results of FIG. 3B are thus more indicative of rate of NO adsorption. FIG. 3B shows the results for all compositions tested in FIG. 3A as well as a prior art $NO_x$ adsorption composition, Pt—BaO/$Al_2O_3$ (aluminum oxide incorporated with platinum and barium oxide). The results show that the PNA compositions of the present teachings having 0.5 wt. % or 1 wt. % Pd again outperform all other compositions, with the 0.5 wt. % sample displaying the fastest NO adsorption kinetics. FIG. 3C shows the percentage of adsorbed NO that is desorbed above 200° C. for each of the compositions of FIG. 3B. The PNA composition having 1 wt. % Pd desorbs over 75% of NO at temperatures above 200° C., while Pt—BaO/$Al_2O_3$ and palladium free substrate desorb only about 55% and 50%, respectively, of NO at temperatures above 200° C. It will be understood that the combined properties of rapid and high capacity NO adsorption at a relatively low temperature (e.g. 100° C.), with substantial desorption occurring only at a significantly higher temperature (e.g. temperatures above 200° C.) is desirable for a PNA composition configured to abate $NO_x$ emissions during vehicle cold start conditions, when $NO_x$ abatement catalysts are relatively inactive.

Figure 4:
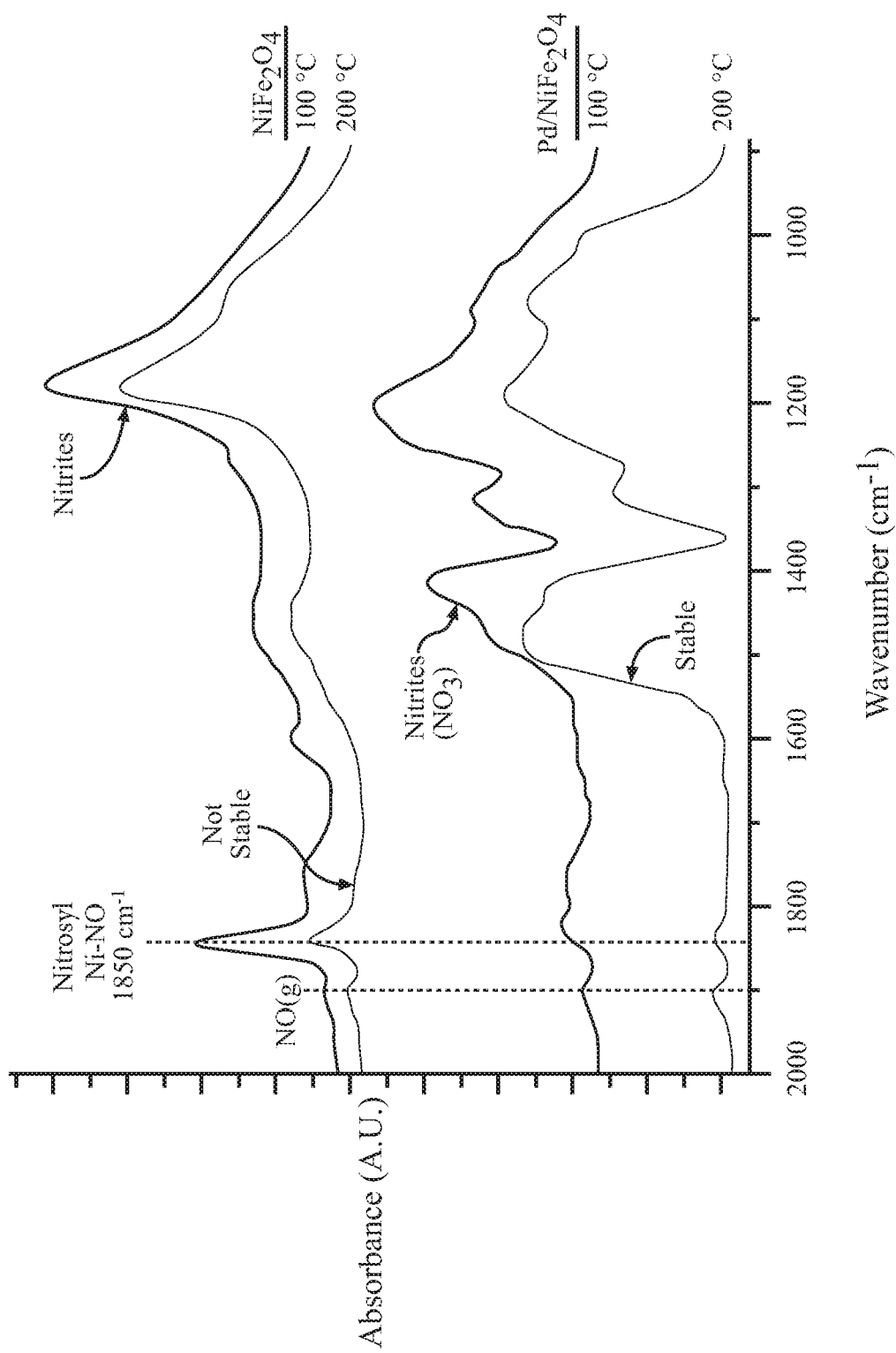
FIG. 4 shows diffuse reflectance infrared Fourier transform spectroscopy (DRIFTS) data for a PNA composition of the present teachings having 1 wt. % palladium (1Pd—$NiFe_2O_4$) as well as palladium-free substrate ($NiFe_2O_4$)

FIG. 4 shows diffuse reflectance infrared Fourier transform spectroscopy (DRIFTS) data for a PNA composition of the present teachings having 1 wt. % palladium (1Pd—$NiFe_2O_4$) as well as palladium-free substrate ($NiFe_2O_4$). The results show that $NiFe_2O_4$ adsorbs NO as nitrites and Ni-nitrosyl at 100° C. Because nitrites of Ni or Fe are thermally stable above 200° C., this observation explains the moderate performance of the base $NiFe_2O_4$ in NO desorption. However Ni-nitrosyls are known to decompose at lower temperatures (i.e. below 200° C.), which is evident given the decrease in Ni-nitrosyl from 100-200° C. in the DRIFTS spectrum of $NiFe_2O_4$. Comparison to the results for $1Pd-NiFe_2O_4$ shows that the presence of Pd suppresses formation of Ni-nitrosyl, causing NO to adsorb as more thermally-stable nitrites and nitrates. This observation explains both the improved NO desorption profile and increase in NO storage capacity of various PNA compositions of the present teachings, including $1Pd-NiFe_2O_4$, over the palladium-free substrate. There is no evidence to indicate that NO adsorption occurs solely on Pd or Pd-associated sites, which is consistent with the observation that Pd loading beyond 1 wt. % does not yield additional improvements in NO adsorption capacity. Indeed, as noted above, higher palladium loadings (e.g. 2% and 3%) lead to performance deterioration, possibly due to the increased coverage of $NiFe_2O_4$ surface by PdO.

Figure 5:
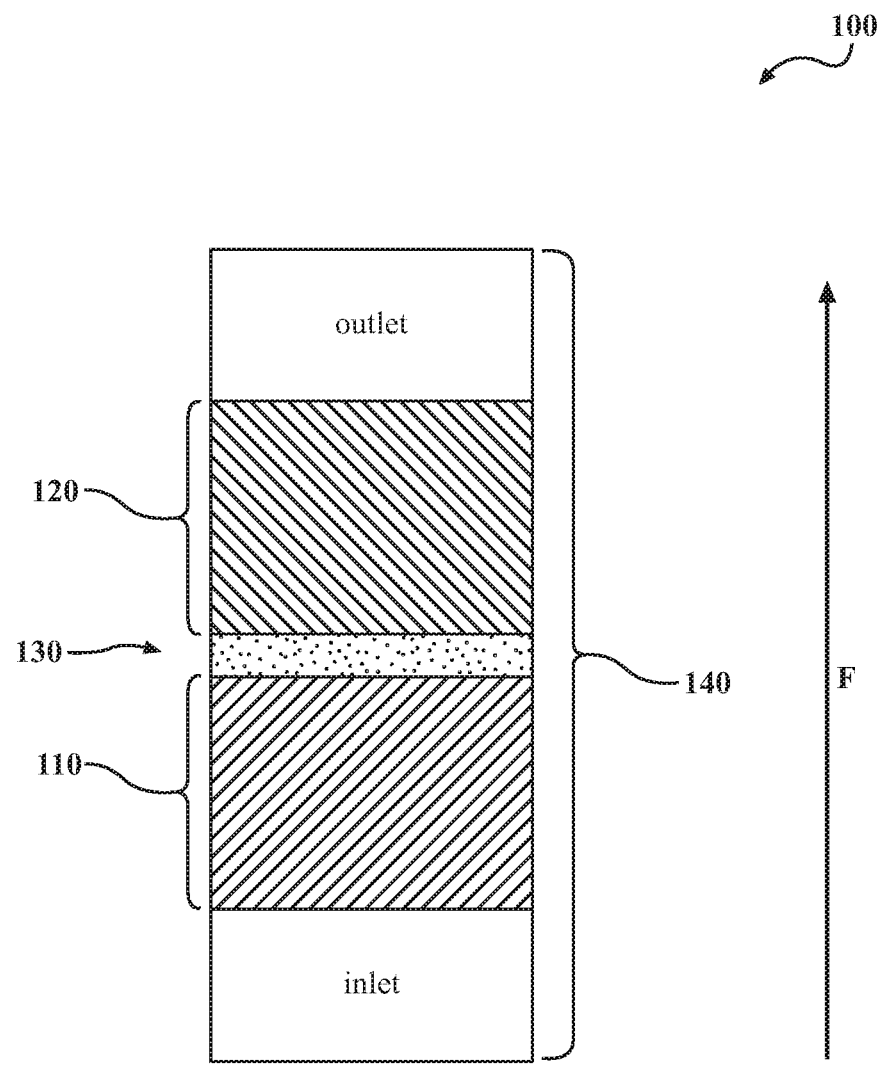
FIG. 5 shows a schematic plan view of an exemplary two-stage $NO_x$ abatement device of the present teachings.

Thus, and with reference to FIG. 5, a two-stage $NO_x$ abatement device 100 is disclosed. FIG. 5 shows a schematic plan view of an exemplary two-stage device. The device 100 can include an enclosure 140 having an inlet and an outlet. The enclosure 140 can be configured to contain a low-temperature $NO_x$ storage component 110, and a high-temperature $NO_x$ conversion catalyst 120 located downstream from the storage component. The $NO_x$ storage component 110 is configured to adsorb $NO_x$ when at low temperature, and to desorb $NO_x$ when at higher temperature. Thus, and in view of the results presented above, the $NO_x$ storage component 110 will generally include a PNA composition of the present teachings, having the formula $Pd-NiFe_2O_4$, as described above.

The $NO_x$ conversion catalyst 120 is generally configured to catalyze conversion of $NO_x$, for example through selective catalytic reduction, three-way catalysis, direct $NO_x$ decomposition, or any other suitable mechanism of $NO_x$ conversion.

In some implementations, the storage component 110 and the conversion catalyst 120 can be spatially separated from one another, as illustrated in the example of FIG. 5. In such implementations, the storage component 110 and the conversion catalyst 120 can be in adjacent contact, or, as shown in FIG. 5, can be separated by a separation space 130. When present, such a separation space 130 can be substantially vacant, or can be occupied with a porous, gas permeable, or other suitable material.

The terms "upstream" and "downstream" are used herein in relation to an intended direction of exhaust gas stream flow through the device 100, represented by the arrow F in FIG. 5. For example, the storage component 110 can be positioned in an upstream portion of the exhaust gas stream, a region proximal to a gas inlet portion, and the conversion catalyst 120 can be positioned in a downstream portion of the exhaust gas stream, a region proximal to a gas outlet portion.

It will be understood that in implementations in which the storage component 110 is positioned in an upstream portion of the exhaust gas stream and the conversion catalyst 120 is positioned in a downstream portion of the exhaust gas stream, this can cause the exhaust gas stream to encounter the storage component 110 before the exhaust gas stream encounters the conversion catalyst 120.

Thus, during a vehicle "cold start", when exhaust gas is at relatively low temperature, the low temperature exhaust gas will first encounter the storage component 110, where it will be adsorbed and stored, according to the thermal adsorption desorption profiles of FIG. 2. As the exhaust gas warms with increasing duration of engine operation, the storage component 110 will warm as well, resulting in desorption of the temporarily stored $NO_x$, so that the $NO_x$ can flow downstream to the conversion catalyst. It will be understood that most $NO_x$ conversion catalysts will have low-to-negligible catalytic activity at low, cold start temperatures. Thus, one benefit of the present device 100 is that cold $NO_x$ will be retained in the storage component until the exhaust and the device 100 have warmed sufficiently to activate the downstream conversion catalyst 120. As such, it will be desirable that the conversion catalyst 120 be thermally matched with the storage component 110. For example, it may be desirable that the conversion catalyst 120 achieve at least 50% of maximum catalytic activity at a temperature of 300° C. or 400° C., so that it will be sufficiently active when $NO_x$ desorption from the storage component 110 begins.

The catalyst systems of the present disclosure can be used in a chamber or an enclosure, such as a catalytic converter, having an inlet and an outlet. As is commonly known to those of ordinary skill in the art, such a chamber or enclosure can be configured to receive an exhaust gas stream through the inlet and to exit the exhaust gas stream through the outlet, such that the exhaust gas stream has a particular or defined flow direction.

The present invention is further illustrated with respect to the following examples. It needs to be understood that these examples are provided to illustrate specific embodiments of the present invention and should not be construed as limiting the scope of the present invention.

Example 1. Synthesis of PNA Compositions

The $Pd-NiFe_2O_4$ catalysts are prepared utilizing wet impregnation of $NiFe_2O_4$ (commercial, Sigma Aldrich) via a solution of toluene (50 ml) and a quantity of Palladium (II) Acetylacetonate corresponding to Pd weight loadings of 0.5, 1, 2 and 3 wt. % Pd, placed in 250 ml beaker and stirred on hotplate at 90° C. overnight. This mixture is then transferred to a furnace, dried at 120° C. for 12 hours, and ramped to 500° C. at 2° C./minute, allowed to dwell for 1 hour, and then naturally cooled to ambient temperature.

Example 2. No Adsorption/Desorption Measurements

The NO Adsorption capacity and NO desorption profiles of the samples at 100° C. are collected via TGA-MS (Thermogravimetry coupled with Mass Spectrometry) process. Initially, the sample is held at room temperature in the TGA sample holder, under Ar flow for 15 minutes to obtain the initial sample mass. Next, the temperature is increased linearly at a rate of 10° C./min, until 150° C. Next, the temperature is maintained constant at 150° C. for 20 minutes to dehydrate the sample. After, the temperature is further increased to 600° C. under Ar flow, and held for one hour to clean the surface. After cooling to 100° C. in Ar, and allowing the system and detectors to stabilize, the sample is exposed to 1.5% NO/He/Ar, for 30 minutes. The quantity of NO adsorbed in micromoles is calculated by the mass change prior to and after exposure to NO gas, as measured by the TGA balance. The values are reported on a micromole NO per gram material basis. For the desorption process, the gas is first switched back to Ar only, and held for 30 minutes to flush NO gas through the dead volume of the system to establish an MS baseline for m/z=30. Then, the temperature is ramped at 2.5° C./min to 400° C., and held for 30 minutes to complete the desorption process.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A $NO_x$ storage component for a two-stage $NO_x$ abatement device for removal of $NO_x$ from engine exhaust during a cold start, the $NO_x$ storage component comprising a passive $NO_x$ adsorption (PNA) composition comprising:
   a nickel ferrite ($NiFe_2O_4$) substrate; and
   a palladium component adsorbed on surfaces of the nickel ferrite substrate;
   wherein, during an engine cold start, $NO_x$ is retained in the $NO_x$ storage component until the exhaust gas and the abatement device have warmed in excess of 200° C.

2. The $NO_x$ storage component as recited in claim 1, wherein the palladium component comprises a palladium oxide.

3. The $NO_x$ storage component as recited in claim 1, wherein the palladium component comprises palladium (II) oxide.

4. The $NO_x$ storage component as recited in claim 1, wherein palladium is present at a weight percentage of from about 0.1 to about 3 wt. %.

5. The $NO_x$ storage component as recited in claim 1, wherein palladium is present at a weight percentage of from about 0.1 to about 1.5 wt. %.

6. The $NO_x$ storage component as recited in claim 1, wherein palladium is present at a weight percentage of from about 0.5 to about 1 wt. %.

7. A method of synthesizing a PNA composition, the method comprising:
   performing wet impregnation of nickel ferrite with a palladium salt solution having a volatile or combustible anion, to produce an impregnated composition; and
   calcining the impregnated composition in an oxidative atmosphere to produce the PNA composition.

8. The method as recited in claim 7, wherein palladium in the palladium salt solution is present, relative to nickel ferrite, at a weight percentage of from about 0.1 to about 3 wt. %.

9. The method as recited in claim 7, wherein palladium in the palladium salt solution is present, relative to nickel ferrite, at a weight percentage of from about 0.1 to about 1.5 wt. %.

10. The method as recited in claim 7, wherein palladium in the palladium salt solution is present, relative to nickel ferrite, at a weight percentage of from about 0.5 to about 1 wt. %.

11. The method as recited in claim 7, wherein the palladium salt solution comprises palladium (II) acetylacetonate.

12. A passive $NO_x$ adsorption (PNA) composition comprising:
   a nickel ferrite ($NiFe_2O_4$) substrate; and
   palladium oxide adsorbed on surfaces of the nickel ferrite substrate.

13. The PNA composition as recited in claim 12, wherein palladium is present at a weight percentage of from about 0.1 to about 3 wt. %.

14. The PNA composition as recited in claim 12, wherein palladium is present at a weight percentage of from about 0.1 to about 1.5 wt. %.

15. The PNA composition as recited in claim 12, wherein palladium is present at a weight percentage of from about 0.5 to about 1 wt. %.

* * * * *